(12) United States Patent
Ma

(10) Patent No.: US 10,405,340 B2
(45) Date of Patent: Sep. 3, 2019

(54) SECURITY MESSAGE TRANSMISSION METHOD AND APPARATUS

(71) Applicant: HUAWEI TECHNOLOGIES CO., LTD., Shenzhen (CN)

(72) Inventor: Jie Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 15/280,024

(22) Filed: Sep. 29, 2016

(65) Prior Publication Data

US 2017/0019917 A1 Jan. 19, 2017

Related U.S. Application Data

(63) Continuation of application No. PCT/CN2015/070995, filed on Jan. 19, 2015.

(30) Foreign Application Priority Data

Apr. 1, 2014 (CN) .......................... 2014 1 0128598

(51) Int. Cl.
*G01R 31/08* (2006.01)
*G06F 11/00* (2006.01)
(Continued)

(52) U.S. Cl.
CPC ...... *H04W 72/1294* (2013.01); *G06F 21/554* (2013.01); *G08G 1/091* (2013.01);
(Continued)

(58) Field of Classification Search
CPC ... H04W 72/1294; H04W 4/70; H04W 4/008; H04W 4/046; H04W 4/06; G06F 21/554;
(Continued)

(56) References Cited

U.S. PATENT DOCUMENTS 7,629,899 B2 * 12/2009 Breed ................... B60N 2/2863
340/435
7,970,381 B2 * 6/2011 Chesnutt ................. H04L 51/38
455/410

(Continued)

FOREIGN PATENT DOCUMENTS

CN 101286267 10/2008
CN 101350134 1/2009
(Continued)

OTHER PUBLICATIONS

International Search Report dated Apr. 29, 2015 in corresponding International Application No. PCT/CN2015/070995.
(Continued)

*Primary Examiner* — Stephen M D Agosta
(74) *Attorney, Agent, or Firm* — Staas & Halsey LLP

(57) ABSTRACT

The present invention relates to a security message transmission method and apparatus. The method includes: generating, by a vehicle terminal, a first security message, where the first security message carries message type information; adding priority indication information of the security message to a geographic information layer according to the message type information, and obtaining a second security message; determining, at a Media Access Control (MAC) layer, a transmission path of the security message according to the priority indication information; and sending the second security message to a recipient by using a physical layer corresponding to the determined transmission path, so that the recipient performs forwarding processing on the second security message. According to the present invention, a security message is forwarded to a vehicle terminal within a predetermined distance range in a manner of combining a VDC technology and an LTE cellular network.

15 Claims, 4 Drawing Sheets

(51) Int. Cl.
| | |
|---|---|
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 72/12* | (2009.01) |
| *H04W 4/70* | (2018.01) |
| *H04W 4/80* | (2018.01) |
| *H04W 4/04* | (2009.01) |
| *G06F 21/55* | (2013.01) |
| *G08G 1/09* | (2006.01) |
| *G08G 1/16* | (2006.01) |
| *H04L 12/58* | (2006.01) |
| *H04L 29/12* | (2006.01) |
| *H04L 29/06* | (2006.01) |
| *H04L 29/08* | (2006.01) |
| *H04W 4/06* | (2009.01) |
| *H04W 72/00* | (2009.01) |
| *H04W 72/04* | (2009.01) |

(52) U.S. Cl.
CPC ............ *G08G 1/163* (2013.01); *H04L 51/26* (2013.01); *H04L 61/6022* (2013.01); *H04L 63/04* (2013.01); *H04L 67/12* (2013.01); *H04W 4/046* (2013.01); *H04W 4/06* (2013.01); *H04W 4/70* (2018.02); *H04W 4/80* (2018.02); *H04W 72/005* (2013.01); *H04W 72/042* (2013.01); *G06F 2221/2111* (2013.01); *G08G 1/16* (2013.01)

(58) Field of Classification Search
CPC ..... H04L 51/26; H04L 61/6022; H04L 63/04; H04L 67/12
See application file for complete search history.

(56) References Cited

U.S. PATENT DOCUMENTS

| | | | | |
|---|---|---|---|---|
| 8,145,183 | B2* | 3/2012 | Barbeau | H04M 3/42348 455/404.1 |
| 8,483,652 | B2* | 7/2013 | Hall | A63F 13/10 455/404.1 |
| 8,514,825 | B1 | 8/2013 | Addepalli et al. | |
| 8,520,695 | B1* | 8/2013 | Rubin | G08G 9/02 370/445 |
| 2006/0276162 | A1 | 12/2006 | Flick et al. | |
| 2007/0005609 | A1 | 1/2007 | Breed | |
| 2007/0070913 | A1* | 3/2007 | Kallio | H04W 28/06 370/252 |
| 2008/0180280 | A1* | 7/2008 | Breed | B60N 2/2863 340/901 |
| 2009/0045977 | A1* | 2/2009 | Bai | G08G 1/161 340/905 |
| 2012/0127874 | A1* | 5/2012 | Oh | H04W 74/0833 370/252 |
| 2012/0244800 | A1* | 9/2012 | Yen | H04W 28/08 455/39 |
| 2012/0314670 | A1* | 12/2012 | Nakajima | H04L 45/24 370/329 |
| 2012/0315882 | A1* | 12/2012 | Chang | H04M 1/72522 455/414.1 |
| 2013/0279392 | A1* | 10/2013 | Rubin | H04W 72/005 370/312 |
| 2014/0164582 | A1* | 6/2014 | Dawson | H04W 48/18 709/221 |
| 2014/0278029 | A1* | 9/2014 | Tonguz | G08G 1/161 701/117 |

FOREIGN PATENT DOCUMENTS

| | | |
|---|---|---|
| CN | 101729167 A | 6/2010 |
| CN | 102711101 A | 10/2012 |
| KR | 1020110059091 | 6/2011 |

OTHER PUBLICATIONS

International Search Report, dated Apr. 29, 2015, in International Application No. PCT/CN2015/070995 (4 pp).

Written Opinion of the International Searching Authority, dated Apr. 29, 2015, in International Application No. PCT/CN2015/070995 (8 pp.).

Extended European Search Report, dated Mar. 27, 2017, in European Application No. 15774008.5 (6 pp.).

Chinese Office Action dated Sep. 4, 2017 in corresponding Chinese Patent Application No. 201410128598.2.

\* cited by examiner

SECURITY MESSAGE TRANSMISSION METHOD AND APPARATUS

CROSS-REFERENCE TO RELATED APPLICATIONS

This application is a continuation of International Patent Application No. PCT/CN2015/070995, filed on Jan. 19, 2015, which claims priority to Chinese Patent Application No. 201410128598.2, filed on Apr. 1, 2014, All of the aforementioned patent applications are hereby incorporated by reference in their entireties.

TECHNICAL FIELD

The present invention relates to the field of data communications technologies, and in particular, to a security message transmission method and apparatus.

BACKGROUND

The Internet of Vehicles can provide, to a vehicle, entertainment service information, service information such as efficiency, and security information that can protect the vehicle from a collision, where the security information is related to driving information of the vehicle. Generally, a driving speed of a vehicle is relatively fast. To avoid a collision, a transmission delay of the security information is required to be within 100 ms. Coverage of a cellular network is wide, a process of establishing a link is relatively complex, and it is hard to ensure a time latency. Therefore, a vehicle direct communication technology, for example, a dedicated short range communications (DSRC) technology, may be used for communication to send a security message within a relatively short distance with a relatively long delay. In some cases, the security message also needs to be transmitted within a long distance. For example, when a vehicle collision occurs at a key road section, the security message may need to be notified to a vehicle that is far away.

In the prior art, a vehicle terminal may send a security message by using a DSRC device. A vehicle terminal receiving the security message continues forwarding the security message. A requirement on a long-distance coverage of the security message is satisfied after multiple times of forwarding by vehicles. However, because a sending distance of the DSRC device is 300 m, the security message can be forwarded only when there are at least two vehicles within a range of 300 m. However, in a case in which vehicle intensity is excessively high, if each vehicle forwards the security message after receiving the security message, a broadcast storm will occur. As a result, the security message cannot be forwarded to a vehicle within a predetermined distance range within a specific time.

SUMMARY

Embodiments of the present invention provide a security message transmission method and apparatus, so as to forward, within a predetermined delay, a security message to a vehicle terminal within a predetermined distance range in a manner of combining a vehicle direct communication (VDC) technology with an LTE cellular network, thereby reducing a transmission delay of the security message.

According to a first aspect, an embodiment of the present invention provides a security message transmission method, where the method includes:

generating, by a vehicle terminal, a first security message, where the first security message carries message type information;

adding priority indication information of the security message to a geographic information layer according to the message type information, and obtaining a second security message;

determining, at a Media Access Control (MAC) layer, a transmission path of the security message according to the priority indication information; and sending the second security message to a recipient by using a physical layer corresponding to the determined transmission path, so that the recipient performs forwarding processing on the second security message.

With reference to the first aspect, in a first possible implementation manner, the method further includes: adding current geographic location (GEO) information and movement attribute information of the vehicle terminal to the geographic information layer, so that the recipient performs forwarding processing according to the GEO information and/or the movement attribute information, where the GEO information includes longitude information, latitude information, and altitude information of the vehicle terminal; and the movement attribute information includes driving speed information and driving direction information.

With reference to the first aspect, in a second possible implementation manner, the determining, at a MAC layer, a transmission path of the security message according to the priority indication information specifically includes: if the priority indication information indicates that the security message has a high priority, transmitting the security message to a neighboring vehicle terminal by using a vehicle direct communication (VDC) specialized resource; or if the priority indication information indicates that the security message has a low priority, transmitting the security message to a base station by using a cellular network.

With reference to the first aspect, in a third possible implementation manner, the determining, at a MAC layer, a transmission path of the security message according to the priority indication information specifically includes: if the priority indication information indicates that the security message has a high priority, transmitting the security message to a neighboring vehicle terminal by using a VDC specialized resource, and further transmitting the security message to a base station by using the VDC specialized resource; or if the priority indication information indicates that the security message has a low priority, transmitting the security message to a base station by using a cellular network.

With reference to the first aspect, in a fourth possible implementation manner, when the security message is a time-validity security message, a shorter valid time of the time-validity security message indicates a higher priority of the time-validity security message; and when the valid time of the time-validity security message is zero, the time-validity security message is discarded.

According to a second aspect, an embodiment of the present invention provides a security message transmission method, where the method includes:

receiving, by a base station, a message sent by a vehicle terminal;

after it is determined, at a Media Access Control MAC layer, that a message type of the message is a security message, obtaining, at a geographic information layer, priority indication information and location information of the security message;

determining, according to the priority indication information, a forwarding area corresponding to the security message; and sending the security message in a broadcast manner within the forwarding area according to the location information, so that a vehicle terminal within the forwarding area can receive the security message.

With reference to the second aspect, in a first possible implementation manner, the determining, according to the priority indication information, a forwarding area corresponding to the security message specifically includes: querying a forwarding area mapping table, to obtain the forwarding area corresponding to the priority indication information; or determining the message type of the security message according to the priority indication information, and querying a forwarding area mapping table, to obtain the forwarding area corresponding to the message type.

With reference to the second aspect, in a second possible implementation manner, the sending the security message in a broadcast manner within the forwarding area according to the location information specifically includes: determining, according to the location information and the forwarding area, whether the entire forwarding area is coverage of the base station; and if the entire forwarding area is the coverage of the base station, sending the security message in a broadcast manner in the base station; and if the forwarding area further includes coverage of a neighboring base station, sending the security message to the neighboring base station by using an X2 interface, and sending the security message in a broadcast manner within the coverage of the base station and the neighboring base station.

With reference to the second possible implementation manner of the second aspect, in a third possible implementation manner, the sending the security message in a broadcast manner in the base station is specifically: sending the security message in a broadcast manner by using a broadcast channel (BCH) of the base station; or sending the security message in a broadcast manner by using a physical downlink security message channel (PDSMCH) of the base station.

With reference to the third possible implementation manner of the second aspect, in a fourth possible implementation manner, the sending the security message in a broadcast manner by using a PDSMCH of the base station is specifically: performing scrambling processing on downlink control information by using security message temporary identifier information, and sending, by using a physical downlink control channel (PDCCH), the scrambled downlink control information and the security message indicated by the downlink control information; or sending the security message in a broadcast manner by using a paging Paging2 message, where the Paging2 message carries security message temporary identifier information and resource scheduling information.

According to a third aspect, an embodiment of the present invention provides a security message transmission apparatus, where the apparatus includes:

a generation unit, configured to generate a first security message, where the first security message carries message type information;

an adding unit, configured to: add priority indication information of the security message to a geographic information layer according to the message type information, and obtain a second security message;

a determining unit, configured to determine, at a Media Access Control (MAC) layer, a transmission path of the security message according to the priority indication information; and a sending unit, configured to send the second security message to a recipient by using a physical layer corresponding to the determined transmission path, so that the recipient performs forwarding processing on the second security message.

With reference to the third aspect, in a first possible implementation manner, the adding unit is further configured to add current geographic location GEO information and movement attribute information of the vehicle terminal to the geographic information layer, so that the recipient performs forwarding processing according to the GEO information and/or the movement attribute information, where the GEO information includes: longitude information, latitude information, and altitude information of the vehicle terminal; and the movement attribute information includes driving speed information and driving direction information.

With reference to the third aspect, in a second possible implementation manner, the determining unit is specifically configured to: if the priority indication information indicates that the security message has a high priority, transmit the security message to a neighboring vehicle terminal by using a vehicle direct communication VDC specialized resource; or if the priority indication information indicates that the security message has a low priority, transmit the security message to a base station by using a cellular network.

With reference to the third aspect, in a third possible implementation manner, the determining unit is specifically configured to: if the priority indication information indicates that the security message has a high priority, transmit the security message to a neighboring vehicle terminal by using a VDC specialized resource, and further transmit the security message to a base station by using the VDC specialized resource; or if the priority indication information indicates that the security message has a low priority, transmit the security message to a base station by using a cellular network.

With reference to the third aspect, in a fourth possible implementation manner, when the security message is a time-validity security message, a shorter valid time of the time-validity security message indicates a higher priority of the time-validity security message; and when the valid time of the time-validity security message is zero, the time-validity security message is discarded.

According to a fourth aspect, an embodiment of the present invention provides a security message transmission apparatus, where the apparatus includes:

a receiving unit, configured to receive a message sent by a vehicle terminal;

an obtaining unit, configured to: after it is determined, at a Media Access Control MAC layer, that a message type of the message is a security message, obtain, at a geographic information layer, priority indication information and location information of the security message; a determining unit, configured to determine, according to the priority indication information, a forwarding area corresponding to the security message; and a sending unit, configured to send the security message in a broadcast manner within the forwarding area according to the location information, so that a vehicle terminal within the forwarding area can receive the security message.

With reference to the fourth aspect, in a first possible implementation manner, the determining unit is specifically configured to: query a forwarding area mapping table, to obtain the forwarding area corresponding to the priority indication information; or determine the message type of the security message according to the priority indication information, and query a forwarding area mapping table, to obtain the forwarding area corresponding to the message type.

With reference to the fourth aspect, in a second possible implementation manner, the sending unit is specifically configured to: determine, according to the location information and the forwarding area, whether the entire forwarding area is coverage of a base station; and if the entire forwarding area is the coverage of the base station, send the security message in a broadcast manner in the base station; and if the forwarding area further includes coverage of a neighboring base station, send the security message to the neighboring base station by using an X2 interface, and send the security message in a broadcast manner within the coverage of the base station and the neighboring base station.

With reference to the second possible implementation manner of the fourth aspect, in a third possible implementation manner, the sending unit is specifically configured to: send the security message in a broadcast manner by using a broadcast channel BCH of the base station; or send the security message in a broadcast manner by using a physical downlink security message channel PDSMCH of the base station.

With reference to the third possible implementation manner of the fourth aspect, in a fourth possible implementation manner, the sending unit is specifically configured to: perform scrambling processing on downlink control information by using security message temporary identifier information, and send, by using a physical downlink control channel PDCCH, the scrambled downlink control information and the security message indicated by the downlink control information; or send the security message in a broadcast manner by using a paging Paging2 message, where the Paging2 message carries security message temporary identifier information and resource scheduling information.

According to the security message transmission method and apparatus provided in the embodiments of the present invention, a vehicle terminal generates a first security message, where the first security message carries message type information; priority indication information of the security message is added to a geographic information layer according to a message type of the first security message, and a second security message is obtained; a transmission path of the security message is determined at a MAC layer according to the priority indication information; and the second security message is transmitted to a corresponding recipient by using the determined transmission path, so that the recipient performs forwarding processing on the second security message. Therefore, according to the embodiments of the present invention, a security message can be forwarded, within a predetermined delay, to a vehicle terminal within a predetermined distance range by choosing to use a manner of combining a VDC resource with an LTE cellular network according to a priority of the security message, thereby reducing a transmission delay of the security message.

DESCRIPTION OF EMBODIMENTS

In the following description, specific details such as a particular system structure, an interface, and a technology are set forth in an illustrative but not a restrictive sense to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

Figure 1:
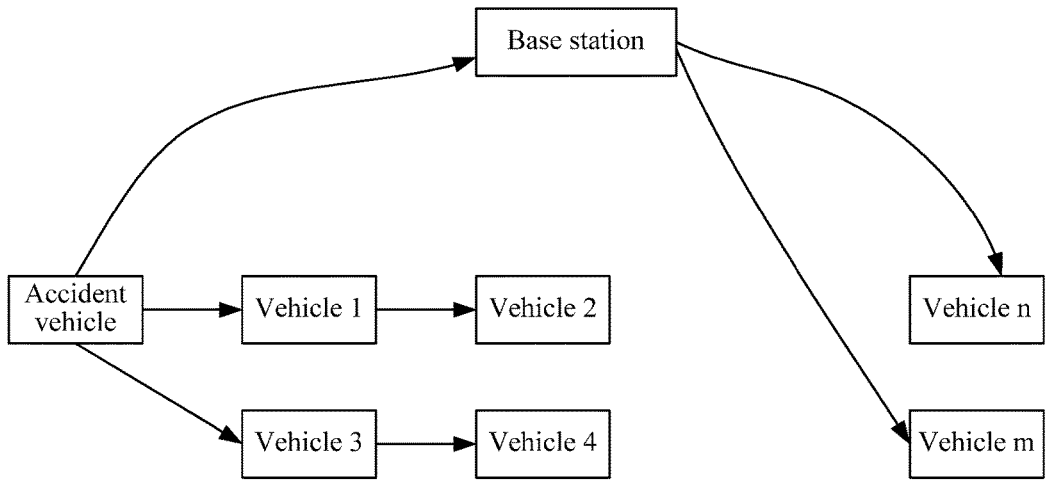
FIG. 1 is a schematic diagram of an application scenario of a security message transmission method according to an embodiment of the present invention.

As a new security message transmission method, in an actual application, the security message transmission method provided in an embodiment of the present invention may be applied to the field of data communications technologies and scenarios in which a traffic fault occurs, such as scenarios in which a road section has a traffic jam, a road section is not suitable for passing through, a vehicle is faulty during driving, there is ice on a road, and vehicles collide with each other. FIG. 1 is a schematic diagram of an application scenario of a security message transmission method according to an embodiment of the present invention. In the application scenario, if a vehicle has a collision, a vehicle terminal may generate a first security message, and the first security message carries a message type, for example, a security-type message, of the security message. Subsequently, the first security message is transmitted to a geographic information layer in a protocol stack, priority indication information of the security message is added to the geographic information layer according to the message type of the first security message and a second security message is obtained, and then the second security message arrives at a MAC layer after transparently passing through a PDCP layer and an RLC layer of the protocol stack. A transmission path of the second security message is determined at the MAC layer according to the priority indication information in the second security message, that is, the second security message is sent by using a cellular network physical layer, by using a VDC physical layer, or by using the cellular network physical layer and the VDC physical layer together. In this way, according to this embodiment of the present invention, a security message is forwarded, within a predetermined delay, to a vehicle terminal within a predetermined distance range in a manner of combining a VDC technology and an LTE cellular network, thereby avoiding occurrence of a broadcast storm, and reducing a transmission delay of the security message.

Figure 2:
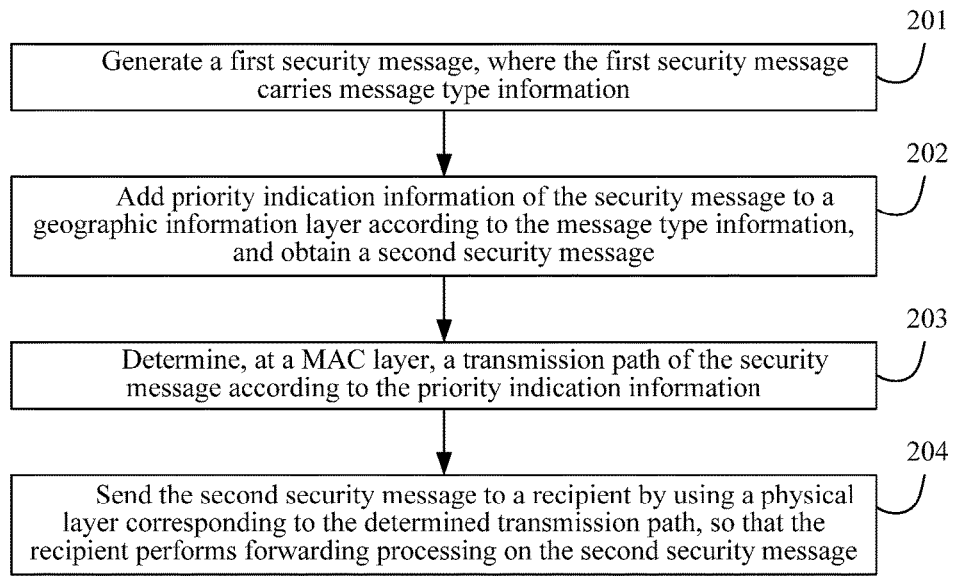
FIG. 2 is a flowchart of a security message transmission method according to an embodiment of the present invention.

FIG. 2 is a flowchart of a security message transmission method according to an embodiment of the present invention. This embodiment is performed by a vehicle terminal that has an accident and that generates a security message. In this embodiment, a method for transmitting a security message to another vehicle terminal by a vehicle terminal is described. As shown in the figure, this embodiment includes the following execution steps:

Step 201: Generate a first security message, where the first security message carries message type information.

A vehicle terminal may generate, according to a type of a traffic fault, a first security message at a road section in which the traffic fault occurs, and the first security message carries a corresponding message type.

Step 202: Add priority indication information of the security message to a geographic information layer according to the message type information, and obtain a second security message.

After generating the first security message, the vehicle terminal may transmit the first security message to a protocol stack of the vehicle terminal for transmission. To implement the technical solution of this embodiment of the present invention, the protocol stack, which is provided in this embodiment of the present invention, of the vehicle terminal has a geographic information ITS-GEO protocol layer above a PDCP protocol layer. The geographic information layer may obtain current location information and speed information of the vehicle terminal from the Global Positioning System (GPS) BeiDou BD or another functional module having a positioning function, and may obtain, according to the message type information carried in the first security message, a priority of a current traffic fault that the vehicle terminal encounters. After obtaining the current location information and speed information of the vehicle terminal, and the priority of the traffic fault, the geographic information layer may add a corresponding field, for example, the priority indication information, geographic location information, and movement attribute information, to the first security message.

It should be noted that a message length of the security message is relatively short, and a requirement on a message transmission delay is relatively high. Therefore, the security message is not sent in an IP addressing manner. A PDCP protocol layer of a protocol stack of the security message may be set to a transparent mode, and compression is not performed by using an IP header. Therefore, the second security message may transparently pass through a PDCP layer and an RLC layer and be transmitted to a MAC layer.

Step 203: Determine, at a Media Access Control MAC layer, a transmission path of the security message according to the priority indication information.

If a base station has only a cellular communication capability and does not have a VDC communication capability, it may be determined, at the MAC layer according to a message type and a message priority of the second security message, whether the security message is transmitted to another vehicle terminal by using only a VDC specialized resource, or the security message is transmitted to the base station by using only a cellular network resource, and the base station sends, in a broadcast manner, the security message to a vehicle terminal within a range that needs to be notified by the security message, or the security message is sent, in a manner of combining a VDC specialized resource with a cellular network resource, to a vehicle terminal within a range that needs to be notified. The determining, at a MAC layer, a transmission path of the security message according to the priority indication information specifically includes: if the priority indication information indicates that the security message has a high priority, transmitting the security message to a neighboring vehicle terminal by using a vehicle direct communication VDC specialized resource; or if the priority indication information indicates that the security message has a low priority, transmitting the security message to a base station by using a cellular network.

If a base station has both a cellular communication capability and a VDC communication capability, it may be determined, at the MAC layer according to a message type and a message priority of the second security message, whether the security message is transmitted to a neighboring vehicle terminal by using a VDC specialized resource and the security message is transmitted to the base station by using the VDC specialized resource, and the base station sends the security message to a vehicle terminal within coverage in a broadcast manner; or the security message is transmitted to the base station by using only a cellular network, and the base station sends the security message to a vehicle terminal within coverage in a broadcast manner. The determining, at a MAC layer, a transmission path of the security message according to the priority indication information specifically includes: if the priority indication information indicates that the security message has a high priority, transmitting the security message to a neighboring vehicle terminal by using a VDC specialized resource, and further transmitting the security message to a base station by using the VDC specialized resource; or if the priority indication information indicates that the security message has a low priority, transmitting the security message to a base station by using a cellular network.

Preferably, the MAC layer entity may further add a sender identifier field to the second security message, so that a recipient, such as the base station or another vehicle terminal, may know the vehicle terminal sending the security message.

Specifically, if the priority of the security message is relatively high, and a network allocates a VDC specialized resource to such a security message of a high priority, the security message is sent by using the specialized resource. Generally, such a security message needs to be sent within a relatively large range. For example, a collision occurs, and a vehicle within a range with a radius of 2 km needs to be notified. Therefore, the security message also needs to be sent in a broadcast manner by using a cellular physical layer interface, so as to rapidly send the security message to a terminal in a broadcast manner within the coverage, thereby reducing a transmission delay of the message. If the security message is sent by both a VDC physical layer and the cellular physical layer, a terminal at a distance from the foregoing terminal and a connected base station can both receive the security message.

If the priority the security message is relatively low, a VDC resource is used in a manner of competition. When there are multiple security messages at the MAC layer, a security message of a high priority is preferentially sent. When one channel can contain multiple security messages, the multiple security messages are encapsulated in descending order of priorities. Priority indication information of a message last sent at the MAC layer indicates the highest priority in the security messages. Therefore, generally, such a message is sent by using the VDC physical layer and is not sent by using the cellular physical layer. Therefore, a base station not supporting VDC communication cannot receive such a message. Only a vehicle around a sender can receive the message by means of VDC communication.

It should be noted that when the security message is a time-validity security message, a shorter valid time of the time-validity security message indicates a higher priority of the time-validity security message; and when the valid time of the time-validity security message is zero, the time-validity security message is discarded.

Step 204: Send the second security message to a recipient by using a physical layer corresponding to the determined transmission path, so that the recipient performs forwarding processing on the second security message.

To implement the technical solution provided in this embodiment of the present invention, a protocol stack of a vehicle terminal supporting VDC communication and cellular network communication has both the cellular network physical layer and the VDC physical layer.

After the transmission path of the security message is determined at the MAC layer, the second security message may be correspondingly sent to the cellular network physical layer, the VDC physical layer, or the cellular network physical layer and the VDC physical layer.

In the technical solution provided in this embodiment of the present invention, a vehicle terminal generates a first security message, where the first security message carries message type information; priority indication information of the security message is added to a geographic information layer according to a message type of the first security message, and a second security message is obtained; a transmission path of the security message is determined at a MAC layer according to the priority indication information; and the second security message is transmitted to a corresponding recipient by using the determined transmission path, so that the recipient performs forwarding processing on the second security message. Therefore, according to this embodiment of the present invention, a security message can be forwarded, within a predetermined delay, to a vehicle terminal within a predetermined distance range by choosing to use a manner of combining a VDC resource with an LTE cellular network according to a priority of the security message, thereby reducing a transmission delay of the security message.

Figure 3:
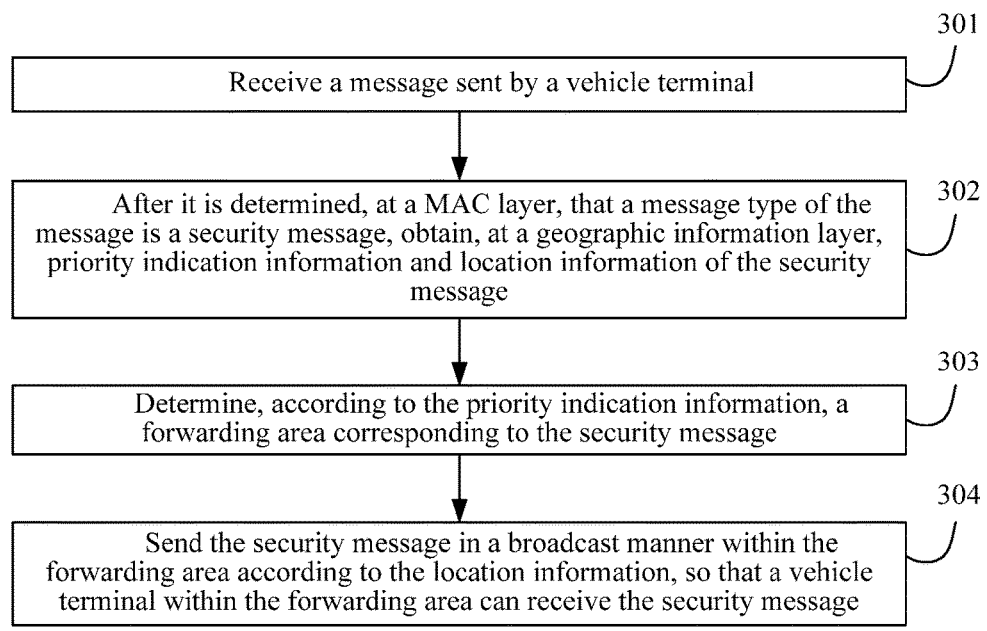
FIG. 3 is a flowchart of another security message transmission method according to an embodiment of the present invention.

In the foregoing embodiment, the vehicle terminal may transmit the security message to the base station by using the cellular network. A method for transmitting, by the base station, the security message to a terminal within coverage after the base station receives the message is described by using an embodiment in the following. FIG. 3 is a flowchart of another security message transmission method according to an embodiment of the present invention. This embodiment is performed by a base station, that is, a base station to which a vehicle terminal sending a security message belongs. As shown in the figure, this embodiment includes the following execution steps:

Step 301: The base station receives a message sent by a vehicle terminal.

If the base station has only a cellular communication capability and does not have a VDC communication capability, a cellular network protocol physical layer of the base station may receive a message packet sent by the vehicle terminal. If the base station not only has a cellular communication capability but also has a VDC communication capability, both a cellular network protocol physical layer and a VDC physical layer of the base station may receive a message packet sent by the vehicle terminal.

Step 302: After it is determined, at a Media Access Control MAC layer, that a message type of the message is a security message, obtain, at a geographic information layer, priority indication information and location information of the security message.

After the physical layer of the base station receives a message, the MAC layer may determine, by using sender identifier information or another piece of identifier information, that the message is a security message. After it is determined that the message is a security message, the security message may be transparently transmitted through a PDCP layer and an RLC layer to the geographic information layer.

When sending the security message, the vehicle terminal adds the priority indication information, the location information, and movement attribute information to the geographic information layer. Therefore, the priority indication information of the security message and the location information of the vehicle terminal may be obtained at the geographic information layer of the base station.

Step 303: Determine, according to the priority indication information, a forwarding area corresponding to the security message.

If a mapping relationship between the priority indication information and the forwarding area of the security message is stored in the base station, the determining, according to the priority indication information, a forwarding area corresponding to the security message specifically includes: querying a forwarding area mapping table, to obtain the forwarding area corresponding to the priority indication information. If a mapping relationship between the message type and the forwarding area of the security message is stored in the base station, the message type of the security message is determined according to the priority indication information, and a forwarding area mapping table is queried, to obtain the forwarding area corresponding to the message type, where the forwarding area may be coverage of several miles around the vehicle terminal Step 304: Send the security message in a broadcast manner within the forwarding area according to the location information, so that a vehicle terminal within the forwarding area can receive the security message.

After obtaining the coverage of the vehicle terminal, the base station may obtain, according to current location information of the vehicle terminal, a cell to which the base station needs to send the security message in a broadcast manner.

The sending the security message in a broadcast manner within the forwarding area according to the location information specifically includes: determining, according to the location information and the forwarding area, whether the entire forwarding area is coverage of the base station; and if the entire forwarding area is the coverage of the base station, sending the security message in a broadcast manner in the base station; and if the forwarding area further includes coverage of a neighboring base station, sending the security message to the neighboring base station by using an X2 interface, and sending the security message in a broadcast manner within the coverage of the base station and the neighboring base station.

The sending the security message in a broadcast manner in the base station is specifically: sending the security message in a broadcast manner by using a broadcast channel BCH of the base station; or sending the security message in a broadcast manner by using a physical downlink security message channel PDSMCH of the base station.

Specifically, when the security message is sent in a broadcast manner by using the BCH, a new SIB block, for example, a SIB 25, is added to a system information SIB of the base station, to be dedicatedly set as the security message. Scheduling on this SIB block is burst. Duration is determined according to a need of the type of the security message.

The sending the security message in a broadcast manner by using a PDSMCH of the base station is specifically: performing scrambling processing on downlink control information by using security message temporary identifier information, and sending, by using a physical downlink control channel PDCCH, the scrambled downlink control information and the security message indicated by the downlink control information; or sending the security message in a broadcast manner by using a paging Paging2 message, where the Paging2 message carries security message temporary identifier information and resource scheduling information.

Specifically, the base station may add a channel: the physical downlink security message channel (PDSMCH). A setting parameter of the channel appears in the PDCCH or appears in the Paging 2 message. When the setting parameter of the channel appears in the PDCCH, a scrambled RNTI is a public RNTI, which is named as SM-RNTI in this application file, as long as the vehicle terminal can obtain, through decoding, scheduling information of the PDCCH scrambled by the SM-RNTI. The scheduling information is the resource scheduling information occupied by the security message, and the terminal receives and decodes a physical signal of a physical layer resource indicated by the foregoing scheduling information, so as to obtain a real security message. When the setting parameter of the channel appears in the Paging2 message, the Paging2 message carries an SM-RNTI and the resource scheduling information. Therefore, the vehicle terminal receives a physical signal of a physical layer resource indicated by the foregoing scheduling information, so as to obtain a real security message.

In the foregoing two methods, the PDCCH requires the terminal to keep parsing the PDCCH, so as to know whether the PDSMCH appears. Processing by the vehicle terminal is excessively frequent, and therefore, a requirement on a processing capability is high. Although the Paging2 message saves the processing capability, appearance of the Paging2 is periodic. Consequently, sometimes, a delay of the security message is relatively long. To save the processing capability of the vehicle terminal and satisfy a delay requirement, the base station may combine the two methods. When the security message is received the first time, the security message is sent to the vehicle terminal by using the Paging2 message, and then in a subsequent period of time, the PDSMCH is scheduled by using PDCCH information. If the security message does not appear for a very long time, the vehicle terminal may not receive a PDCCH information any more, that is, the vehicle terminal first periodically receives the Paging2 message, and then starts receiving the PDCCH information after finding that there is the SM-RNTI. If the scheduling information scrambled by the SM-RNTI is not found in a period of time after the PDCCH is decoded, a status in which only the Paging2 message is received is returned to.

Therefore, according to this embodiment of the present invention, a base station rapidly forwards a received security message to a vehicle terminal within a forwarding area, thereby reducing a transmission delay of the security message.

Figure 4:
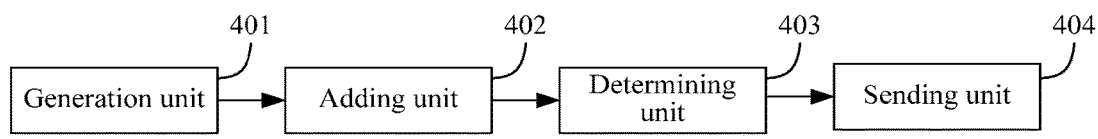
FIG. 4 is a schematic diagram of a security message transmission apparatus according to an embodiment of the present invention.

Correspondingly, an embodiment of the present invention further provides a security message transmission apparatus. FIG. 4 is a schematic diagram of a security message transmission apparatus according to an embodiment of the present invention. As shown in the figure, this embodiment includes:

A generation unit 401 is configured to generate a first security message, where the first security message carries message type information.

A vehicle terminal may generate, according to a type of a traffic fault, a first security message at a road section in which the traffic fault occurs, and the first security message carries a corresponding message type.

An adding unit 402 is configured to: add priority indication information of the security message to a geographic information layer according to the message type information, and obtain a second security message.

The adding unit 402 is further configured to add current geographic location GEO information and movement attribute information of the vehicle terminal to the geographic information layer, so that the recipient performs forwarding processing according to the GEO information and/or the movement attribute information, where the GEO information includes: longitude information, latitude information, and altitude information of the vehicle terminal; and the movement attribute information includes driving speed information and driving direction information.

Specifically, after generating the first security message, the vehicle terminal may transmit the first security message to a protocol stack of the vehicle terminal for transmission. To implement the technical solution of this embodiment of the present invention, the protocol stack, which is provided in this embodiment of the present invention, of the vehicle terminal has a geographic information ITS-GEO protocol layer above a PDCP protocol layer. The geographic information layer may obtain current location information and speed information of the vehicle terminal from the Global Positioning System GPS BeiDou BD or another functional module having a positioning function, and may obtain, according to the message type information carried in the first security message, a priority of a current traffic fault that the vehicle terminal encounters. After obtaining the current location information and speed information of the vehicle terminal, and the priority of the traffic fault, the geographic information layer may add a corresponding field, for example, the priority indication information, geographic location information, and the movement attribute information, to the first security message.

It should be noted that a message length of the security message is relatively short, and a requirement on a message transmission delay is relatively high. Therefore, the security message is not sent in an IP addressing manner. A PDCP protocol layer of a protocol stack of the security message may be set to a transparent mode, and compression is not performed by using an IP header. Therefore, the second security message may transparently pass through a PDCP layer and an RLC layer and be transmitted to a MAC layer.

When the security message is a time-validity security message, a shorter valid time of the time-validity security message indicates a higher priority of the time-validity security message; and when the valid time of the time-validity security message is zero, the time-validity security message is discarded.

A determining unit 403 is configured to determine, at a Media Access Control MAC layer, a transmission path of the security message according to the priority indication information.

The determining unit 403 is specifically configured to: if the priority indication information indicates that the security message has a high priority, transmit the security message to a neighboring vehicle terminal by using a vehicle direct communication VDC specialized resource; or if the priority indication information indicates that the security message has a low priority, transmit the security message to a base station by using a cellular network.

The determining unit 403 is specifically configured to: if the priority indication information indicates that the security message has a high priority, transmit the security message to a neighboring vehicle terminal by using a VDC specialized resource, and further transmit the security message to a base station by using the VDC specialized resource; or if the priority indication information indicates that the security message has a low priority, transmit the security message to a base station by using a cellular network.

Specifically, if a base station has only a cellular communication capability and does not have a VDC communication capability, it may be determined, at the MAC layer according to a message type and a message priority of the second security message, whether the security message is transmitted to another vehicle terminal by using only a VDC specialized resource, or the security message is transmitted to the base station by using only a cellular network resource, and the base station sends, in a broadcast manner, the security message to a vehicle terminal within a range that needs to be notified by the security message, or the security message is sent, in a manner of combining a VDC specialized resource with a cellular network resource, to a vehicle terminal within a range that needs to be notified. The determining, at a MAC layer, a transmission path of the security message according to the priority indication information specifically includes: if the priority indication information indicates that the security message has a high priority, transmitting the security message to a neighboring vehicle terminal by using a vehicle direct communication VDC specialized resource; or if the priority indication information indicates that the security message has a low priority, transmitting the security message to a base station by using a cellular network.

If a base station has both a cellular communication capability and a VDC communication capability, it may be determined, at the MAC layer according to a message type and a message priority of the second security message, whether the security message is transmitted to a neighboring vehicle terminal by using a VDC specialized resource and the security message is transmitted to the base station by using the VDC specialized resource, and the base station sends the security message to a vehicle terminal within coverage in a broadcast manner; or the security message is transmitted to the base station by using only a cellular network, and the base station sends the security message to a vehicle terminal within coverage in a broadcast manner. The determining, at a MAC layer, a transmission path of the security message according to the priority indication information specifically includes: if the priority indication information indicates that the security message has a high priority, transmitting the security message to a neighboring vehicle terminal by using a VDC specialized resource, and further transmitting the security message to a base station by using the VDC specialized resource; or if the priority indication information indicates that the security message has a low priority, transmitting the security message to a base station by using a cellular network.

Preferably, the MAC layer entity may further add a sender identifier field to the second security message, so that a recipient, such as the base station or another vehicle terminal, may know the vehicle terminal sending the security message.

A sending unit 404 is configured to send the second security message to a physical layer corresponding to the determined transmission path to a recipient, so that the recipient performs forwarding processing on the second security message.

To implement the technical solution provided in this embodiment of the present invention, a protocol stack of a vehicle terminal supporting VDC communication and cellular network communication has both a cellular network physical layer and a VDC physical layer.

After the transmission path of the security message is determined at the MAC layer, the second security message may be correspondingly sent to the cellular network physical layer, the VDC physical layer, or the cellular network physical layer and the VDC physical layer.

According to the technical solution provided in this embodiment of the present invention, a security message can be forwarded, within a predetermined delay, to a vehicle terminal within a predetermined distance range by choosing to use a manner of combining a VDC resource with an LTE cellular network according to a priority of the security message, thereby reducing a transmission delay of the security message.

Figure 5:
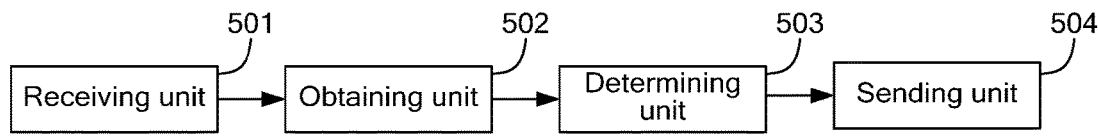
FIG. 5 is a schematic diagram of another security message transmission apparatus according to an embodiment of the present invention.

Correspondingly, an embodiment of the present invention further provides a security message transmission apparatus. FIG. 5 is a schematic diagram of another security message transmission apparatus according to an embodiment of the present invention. As shown in the figure, this embodiment includes:

A receiving unit 501 is configured to receive a message sent by a vehicle terminal.

If the base station has only a cellular communication capability and does not have a VDC communication capability, a cellular network protocol physical layer of the base station may receive a message packet sent by the vehicle terminal. If the base station not only has a cellular communication capability but also has a VDC communication capability, both a cellular network protocol physical layer and a VDC physical layer of the base station may receive a message packet sent by the vehicle terminal.

An obtaining unit 502 is configured to: after it is determined, at a Media Access Control MAC layer, that a message type of the message is a security message, obtain, at a geographic information layer, priority indication information and location information of the security message.

When sending the security message, the vehicle terminal adds the priority indication information, the location information, and movement attribute information to the geographic information layer. Therefore, the priority indication information of the security message and the location information of the vehicle terminal may be obtained at the geographic information layer of the base station.

A determining unit 503 is configured to determine, according to the priority indication information, a forwarding area corresponding to the security message.

If a mapping relationship between the priority indication information and the forwarding area of the security message is stored in the base station, the determining unit 503 is specifically configured to query a forwarding area mapping table, to obtain the forwarding area corresponding to the priority indication information. If a mapping relationship between the message type and the forwarding area of the security message is stored in the base station, the determining unit 503 is specifically configured to: determine the message type of the security message according to the priority indication information, and query a forwarding area mapping table, to obtain the forwarding area corresponding to the message type.

A sending unit 504 is configured to send the security message in a broadcast manner within the forwarding area according to the location information, so that a vehicle terminal within the forwarding area can receive the security message.

After obtaining the coverage of the vehicle terminal, the base station may obtain, according to current location information of the vehicle terminal, a cell to which the base station needs to send the security message in a broadcast manner.

The sending the security message in a broadcast manner within the forwarding area according to the location information specifically includes: determining, according to the location information and the forwarding area, whether the entire forwarding area is coverage of the base station; and if the entire forwarding area is the coverage of the base station, sending the security message in a broadcast manner in the base station; and if the forwarding area further includes coverage of a neighboring base station, sending the security message to the neighboring base station by using an X2 interface, and sending the security message in a broadcast manner within the coverage of the base station and the neighboring base station.

The sending the security message in a broadcast manner in the base station is specifically: sending the security message in a broadcast manner by using a broadcast channel BCH of the base station; or sending the security message in a broadcast manner by using a physical downlink security message channel PDSMCH of the base station.

Specifically, when the security message is sent in a broadcast manner by using the BCH, a new SIB block, for example, a SIB 25, is added to a system information block SIB of the base station, to be dedicatedly set as the security message. Scheduling on this SIB block is burst. Duration is determined according to a need of the type of the security message.

The sending the security message in a broadcast manner by using a PDSMCH of the base station is specifically: performing scrambling processing on downlink control information by using security message temporary identifier information, and sending, by using a physical downlink control channel PDCCH, the scrambled downlink control information and the security message indicated by the downlink control information; or sending the security message in a broadcast manner by using a paging Paging2 message, where the Paging2 message carries security message temporary identifier information and resource scheduling information.

Specifically, the base station may add a channel: the physical downlink security message channel (physical downlink safety message channel, PDSMCH). A setting parameter of the channel appears in the PDCCH or appears in the Paging 2 message. When the setting parameter of the channel appears in the PDCCH, a scrambled RNTI is a public RNTI, which is named as SM-RNTI in this application file, as long as the vehicle terminal can obtain, through decoding, scheduling information of the PDCCH scrambled by the SM-RNTI. The scheduling information is the resource scheduling information occupied by the security message, and the terminal receives and decodes a physical signal of a physical layer resource indicated by the foregoing scheduling information, so as to obtain a real security message. When the setting parameter of the channel appears in the Paging2 message, the Paging2 message carries an SM-RNTI and the resource scheduling information. Therefore, the vehicle terminal receives a physical signal of a physical layer resource indicated by the foregoing scheduling information, so as to obtain a real security message.

Therefore, according to this embodiment of the present invention, a base station rapidly forwards a received security message to a vehicle terminal within a forwarding area, thereby reducing a transmission delay of the security message.

Figure 6:
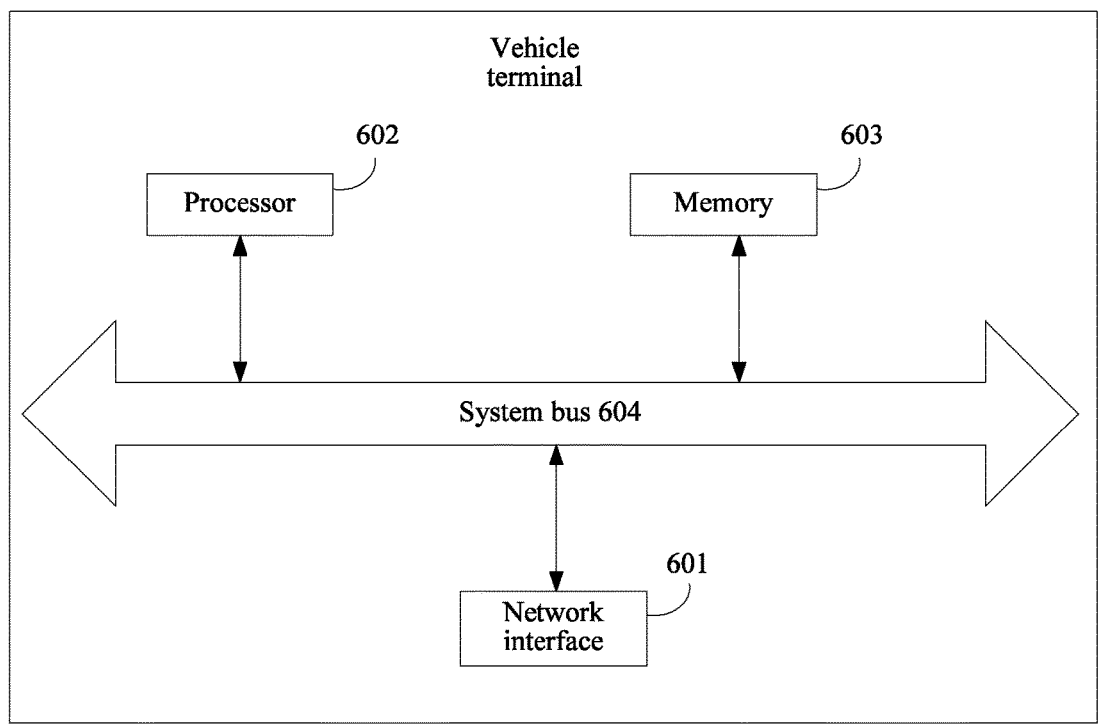
FIG. 6 is a schematic diagram of a vehicle terminal according to an embodiment of the present invention.

Correspondingly, an embodiment of the present invention further provides a vehicle terminal. FIG. 6 is a schematic diagram of a vehicle terminal according to an embodiment of the present invention. As shown in the figure, the vehicle terminal includes: a network interface 601, a processor 602, and a memory 603. A system bus 604 is configured to connect the network interface 601, the processor 602, and the memory 603, and is configured to bear data transmission between components.

The network interface 601 is configured to communicate with another network entity.

There is a software program and a device driver in the memory 603. The processor 602 may load the software program in the memory 603, and enable, according to the software program, the components to perform a corresponding function. The device driver may be an interface driver.

In the vehicle terminal provided in this embodiment of the present invention, the processor 602 loads the software program in the memory 603 and executes the following instructions according to the software program:

generating, by a vehicle terminal, a first security message, where the first security message carries message type information;

adding priority indication information of the security message to a geographic information layer according to the message type information, and obtaining a second security message;

determining, at a Media Access Control MAC layer, a transmission path of the security message according to the priority indication information; and sending the second security message to a recipient by using a physical layer corresponding to the determined transmission path, so that the recipient performs forwarding processing on the second security message.

When the security message is a time-validity security message, a shorter valid time of the time-validity security message indicates a higher priority of the time-validity security message; and when the valid time of the time-validity security message is zero, the time-validity security message is discarded.

Further, the processor 602 may further execute the following instruction: adding current geographic location GEO information and movement attribute information of the vehicle terminal to the geographic information layer, so that the recipient performs forwarding processing according to the GEO information and/or the movement attribute information, where the GEO information includes longitude information, latitude information, and altitude information of the vehicle terminal; and the movement attribute information includes driving speed information and driving direction information.

Specifically, to implement the technical solution of this embodiment of the present invention, a protocol stack, which is provided in this embodiment of the present invention, of the vehicle terminal has a geographic information ITS-GEO protocol layer above a PDCP protocol layer. The geographic information layer may obtain current location information and speed information of the vehicle terminal from the Global Positioning System GPS BeiDou BD or another functional module having a positioning function, and may obtain, according to the message type information carried in the first security message, a priority of a current traffic fault that the vehicle terminal encounters. After obtaining the current location information and speed information of the vehicle terminal, and the priority of the traffic fault, the geographic information layer may add a corresponding field, for example, the priority indication information, geographic location information, and the movement attribute information, to the first security message.

Further, a process of performing, by the processor 602, an operation of determining, at the MAC layer, the transmission path of the security message according to the priority indication information is specifically: if the priority indication information indicates that the security message has a high priority, transmitting the security message to a neighboring vehicle terminal by using a vehicle direct communication VDC specialized resource.

If a base station has only a cellular communication capability and does not have a VDC communication capability, it may be determined, at the MAC layer according to a message type and a message priority of the second security message, whether the security message is transmitted to another vehicle terminal by using only a VDC specialized resource, or the security message is transmitted to the base station by using only a cellular network resource, and the base station sends, in a broadcast manner, the security message to a vehicle terminal within a range that needs to be notified by the security message, or the security message is sent, in a manner of combining a VDC specialized resource with a cellular network resource, to a vehicle terminal within a range that needs to be notified.

If the priority indication information indicates that the security message has a low priority, the security message is transmitted to a base station by using a cellular network.

Further, a process of determining, by the processor 602 at the MAC layer, the transmission path of the security message according to the priority indication information is specifically: if the priority indication information indicates that the security message has a high priority, transmitting the security message to a neighboring vehicle terminal by using a VDC specialized resource, and further transmitting the security message to a base station by using the VDC specialized resource; or if the priority indication information indicates that the security message has a low priority, transmitting the security message to a base station by using a cellular network.

If a base station has both a cellular communication capability and a VDC communication capability, it may be determined, at the MAC layer according to a message type and a message priority of the second security message, whether the security message is transmitted to a neighboring vehicle terminal by using a VDC specialized resource and the security message is transmitted to the base station by using the VDC specialized resource, and the base station sends the security message to a vehicle terminal within coverage in a broadcast manner; or the security message is transmitted to the base station by using only a cellular network, and the base station sends the security message to a vehicle terminal within coverage in a broadcast manner.

To implement the technical solution provided in this embodiment of the present invention, a protocol stack of a vehicle terminal supporting VDC communication and cellular network communication has both a cellular network physical layer and a VDC physical layer.

The vehicle terminal provided in this embodiment of the present invention can forward, within a predetermined delay, a security message to a vehicle terminal within a predetermined distance range by choosing to use a manner of combining a VDC resource with an LTE cellular network according to a priority of the security message, thereby reducing a transmission delay of the security message.

Figure 7:
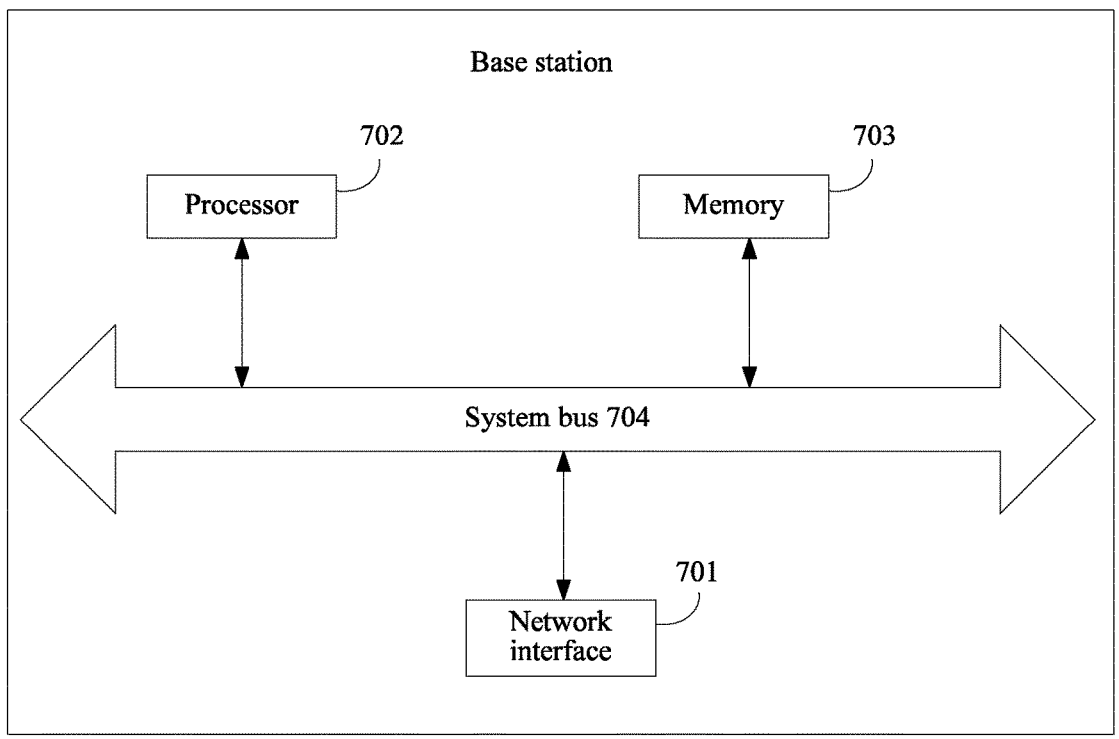
FIG. 7 is a schematic diagram of a base station according to an embodiment of the present invention.

Correspondingly, an embodiment of the present invention further provides a base station. FIG. 7 is a schematic diagram of a base station according to an embodiment of the present invention. As shown in the figure, the base station includes: a network interface 701, a processor 702, and a memory 703. A system bus 704 is configured to connect the network interface 701, the processor 702, and the memory 703, and is configured to bear data transmission between components.

The network interface 701 is configured to communicate with another network entity.

There is a software program and a device driver in the memory 703. The processor 702 may load the software program in the memory 703, and enable, according to the software program, the components to perform a corresponding function. The device driver may be an interface driver.

In a recording & streaming engine provided in this embodiment of the present invention, the processor 702 loads the software program in the memory 703 and executes the following instructions according to the software program:

receiving, by the base station, a message sent by a vehicle terminal;

after it is determined, at a Media Access Control MAC layer, that a message type of the message is a security message, obtaining, at a geographic information layer, priority indication information and location information of the security message;

determining, according to the priority indication information, a forwarding area corresponding to the security message; and sending the security message in a broadcast manner within the forwarding area according to the location information, so that a vehicle terminal within the forwarding area can receive the security message.

After a physical layer of the base station receives a packet, the MAC layer may determine, by using sender identifier information or another piece of identifier information, that the message is a security message. After it is determined that the message is a security message, the security message may be transparently transmitted through a PDCP layer and an RLC layer to the geographic information layer.

When sending the security message, the vehicle terminal adds the priority indication information, the location information, and movement attribute information to the geographic information layer. Therefore, the priority indication information of the security message and the location information of the vehicle terminal may be obtained at the geographic information layer of the base station.

Further, a process of determining, by the processor 702 according to the priority indication information, the forwarding area corresponding to the security message is specifically: querying a forwarding area mapping table, to obtain the forwarding area corresponding to the priority indication information; or determining the message type of the security message according to the priority indication information, and querying a forwarding area mapping table, to obtain the forwarding area corresponding to the message type.

Further, a process of sending, by the processor 702, the security message in a broadcast manner within the forwarding area according to the location information is specifically: determining, according to the location information and the forwarding area, whether the entire forwarding area is coverage of the base station; and if the entire forwarding area is the coverage of the base station, sending the security message in a broadcast manner in the base station; and if the forwarding area further includes coverage of a neighboring base station, sending the security message to the neighboring base station by using an X2 interface, and sending the security message in a broadcast manner within the coverage of the base station and the neighboring base station.

Further, a process of sending, by the processor 702, the security message in a broadcast manner in the base station is specifically: sending the security message in a broadcast manner by using a broadcast channel BCH of the base station; or sending the security message in a broadcast manner by using a physical downlink security message channel PDSMCH of the base station.

Further, a process of sending, by the processor 702, the security message in a broadcast manner by using the PDSMCH of the base station is specifically: performing scrambling processing on downlink control information by using security message temporary identifier information, and sending, by using a physical downlink control channel PDCCH, the scrambled downlink control information and the security message indicated by the downlink control information; or sending the security message in a broadcast manner by using a paging Paging2 message, where the Paging2 message carries security message temporary identifier information and resource scheduling information.

Therefore, according to this embodiment of the present invention, a base station rapidly forwards a received security message to a vehicle terminal within a forwarding area, thereby reducing a transmission delay of the security message.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A security message transmission method, comprising:
generating, by a vehicle terminal, a first security message, wherein the first security message carries message type information;
adding priority indication information of the first security message to a geographic information layer of a protocol stack of the vehicle terminal according to the message type information to thereby obtain a second security message, the geographic information layer being provided above a Packet Data Convergence Control (PDCP) layer of the protocol stack;
adding current geographic location (GEO) information and movement attribute information of the vehicle terminal to the geographic information layer, the GEO information including longitude information, latitude information, and altitude information of the vehicle terminal, and the movement attribute information including driving speed information and driving direction information;
determining, at a Media Access Control (MAC) layer of the protocol stack, a transmission path of the second security message according to the priority indication information; and
sending the second security message to a recipient by using a physical layer of the protocol stack corresponding to the determined transmission path, so that the recipient performs forwarding processing on the second security message according to the GEO information and/or the movement attribute information.

2. A security message transmission method, comprising:
generating, by a vehicle terminal, a first security message, wherein the first security message carries message type information;
adding priority indication information of the first security message to a geographic information layer of a protocol stack of the vehicle terminal according to the message type information to thereby obtain a second security message, the geographic information layer being provided above a Packet Data Convergence Control (PDCP) layer of the protocol stack;
determining, at a Media Access Control (MAC) layer of the protocol stack, a transmission path of the second security message according to the priority indication information; and
sending the second security message to a recipient by using a physical layer of the protocol stack corresponding to the determined transmission path, so that the recipient performs forwarding processing on the second security message,
wherein the determining, at the MAC layer, the transmission path of the second security message according to the priority indication information comprises:
if the priority indication information indicates that the second security message has a high priority:
transmitting the second security message to a neighboring vehicle terminal by using a vehicle direct communication (VDC) specialized resource or transmitting the second security message to the neighboring vehicle terminal by using the VDC specialized resource and further transmitting the second security message to a base station by using the VDC specialized resource; or
if the priority indication information indicates that the second security message has a low priority:
transmitting the second security message to a base station by using a cellular network.

3. A security message transmission method comprising:
generating, by a vehicle terminal, a first security message, wherein the first security message carries message type information;
adding priority indication information of the first security message to a geographic information layer of a protocol stack of the vehicle terminal according to the message type information to thereby obtain a second security message, the geographic information layer being provided above a Packet Data Convergence Control (PDCP) layer of the protocol stack;
determining, at a Media Access Control (MAC) layer of the protocol stack, a transmission path of the second security message according to the priority indication information; and
sending the second security message to a recipient by using a physical layer of the protocol stack corresponding to the determined transmission path, so that the recipient performs forwarding processing on the second security message,
wherein
when the second security message is a time-validity security message, a shorter valid time of the time-validity security message indicates a higher priority of the time-validity security message; and
when the valid time of the time-validity security message is zero, the time-validity security message is discarded.

4. A security message transmission method, comprising:
receiving, by a base station, a message sent by a vehicle terminal;
after it is determined, at a Media Access Control (MAC) layer, that a message type of the message is a security message, obtaining, at a geographic information layer, priority indication information and location information of the security message;
determining, according to the priority indication information, a forwarding area corresponding to the security message; and
sending the security message in a broadcast manner within the forwarding area according to the location information, so that a vehicle terminal within the forwarding area can receive the security message,
wherein the sending the security message in the broadcast manner within the forwarding area according to the location information comprises:
determining, according to the location information and the forwarding area, whether the entire forwarding area is coverage of the base station,
if the entire forwarding area is the coverage of the base station, sending the security message in the broadcast manner in the base station; and
if the forwarding area further comprises coverage of a neighboring base station, sending the security message to the neighboring base station by using an X2 interface, and sending the security message in the broadcast manner within the coverage of the base station and the neighboring base station.

5. The security message transmission method according to claim 4, wherein the sending the security message in the broadcast manner in the base station comprises:
sending the security message in the broadcast manner by using a broadcast channel BCH of the base station; or
sending the security message in the broadcast manner by using a physical downlink security message channel (PDSMCH) of the base station.

6. The security message transmission method according to claim 5, wherein the sending the security message in the broadcast manner by using a PDSMCH of the base station comprises:
performing scrambling processing on downlink control information by using security message temporary identifier information, and sending, by using a physical downlink control channel (PDCCH), the scrambled downlink control information and the security message indicated by the downlink control information; or
sending the security message in the broadcast manner by using a paging Paging2 message, wherein the Paging2 message carries security message temporary identifier information and resource scheduling information.

7. The security message transmission method according to claim 4, wherein the determining, according to the priority indication information, the forwarding area corresponding to the security message comprises:
querying a forwarding area mapping table, to obtain the forwarding area corresponding to the priority indication information; or
determining the message type of the security message according to the priority indication information, and querying a forwarding area mapping table, to obtain the forwarding area corresponding to the message type.

8. A security message transmission apparatus for a vehicle terminal, comprising:
a generation unit, configured to generate a first security message, wherein the first security message carries message type information;
an adding unit, configured to:
add priority indication information of the first security message to a geographic information layer of a protocol stack of the vehicle terminal according to the message type information to thereby obtain a second security message, the geographic information layer being provided above a Packet Data Convergence Control (PDCP) layer of the protocol stack, and
add current geographic location (GEO) information and movement attribute information of the vehicle terminal to the geographic information layer, the GEO information including longitude information, latitude information, and altitude information of the vehicle terminal, and the movement attribute information including driving speed information and driving direction information;
a determining unit, configured to determine, at a Media Access Control (MAC) layer of the protocol stack, a transmission path of the second security message according to the priority indication information; and
a sending unit, configured to send the second security message to a recipient by using a physical layer of the protocol stack corresponding to the determined transmission path, so that the recipient performs forwarding processing on the second security message according to the GEO information and/or the movement attribute information.

9. A security message transmission apparatus for a vehicle terminal, comprising:
a generation unit, configured to generate a first security message, wherein the first security message carries message type information;
an adding unit, configured to add priority indication information of the first security message to a geographic information layer of a protocol stack of the vehicle terminal according to the message type information to thereby obtain a second security message, the geographic information layer being provided above a Packet Data Convergence Control (PDCP) layer of the protocol stack;

a determining unit, configured to determine, at a Media Access Control (MAC) layer of the protocol stack, a transmission path of the second security message according to the priority indication information; and a sending unit, configured to send the second security message to a recipient by using a physical layer of the protocol stack corresponding to the determined transmission path, so that the recipient performs forwarding processing on the second security message, wherein the determining unit is configured to:

if the priority indication information indicates that the second security message has a high priority:
 transmit the second security message to a neighboring vehicle terminal by using a vehicle direct communication (VDC) specialized resource or transmit the second security message to the neighboring vehicle terminal by using the VDC specialized resource and further transmit the second security message to a base station by using the VDC specialized resource; or if the priority indication information indicates that the second security message has a low priority:
 transmit the second security message to a base station by using a cellular network.

10. A security message transmission apparatus for a vehicle terminal, comprising:

a generation unit, configured to generate a first security message, wherein the first security message carries message type information;

an adding unit, configured to add priority indication information of the first security message to a geographic information layer of a protocol stack of the vehicle terminal according to the message type information to thereby obtain a second security message, the geographic information layer being provided above a Packet Data Convergence Control (PDCP) layer of the protocol stack;

a determining unit, configured to determine, at a Media Access Control (MAC) layer of the protocol stack, a transmission path of the second security message according to the priority indication information; and a sending unit, configured to send the second security message to a recipient by using a physical layer of the protocol stack corresponding to the determined transmission path, so that the recipient performs forwarding processing on the second security message, wherein when the second security message is a time-validity security message, a shorter valid time of the time-validity security message indicates a higher priority of the time-validity security message; and when the valid time of the time-validity security message is zero, the time-validity security message is discarded.

11. A security message transmission apparatus, comprising:

a receiving unit, configured to receive a message sent by a vehicle terminal;

an obtaining unit, configured to: after it is determined, at a Media Access Control (MAC) layer, that a message type of the message is a security message, obtain, at a geographic information layer, priority indication information and location information of the security message;

a determining unit, configured to determine, according to the priority indication information, a forwarding area corresponding to the security message; and a sending unit, configured to:
 determine, according to the location information and the forwarding area, whether the entire forwarding area is coverage of a base station,
 if the entire forwarding area is the coverage of the base station, send the security message in the broadcast manner in the base station so that a vehicle terminal within the forwarding area can receive the security message, and
 if the forwarding area further comprises coverage of a neighboring base station, send the security message to the neighboring base station by using an X2 interface, and send the security message in the broadcast manner within the coverage of the base station and the neighboring base station, so that the vehicle terminal within the forwarding area can receive the security message from at least one of the base station and the neighboring base station.

12. The security message transmission apparatus according to claim 11, wherein the sending unit is configured to:
 send the security message in the broadcast manner by using a broadcast channel BCH of the base station; or
 send the security message in the broadcast manner by using a physical downlink security message channel (PDSMCH) of the base station.

13. The security message transmission apparatus according to claim 12, wherein the sending unit is configured to:
 perform scrambling processing on downlink control information by using security message temporary identifier information, and send, by using a physical downlink control channel (PDCCH), the scrambled downlink control information and the security message indicated by the downlink control information; or
 send the security message in the broadcast manner by using a paging Paging2 message, wherein the Paging2 message carries security message temporary identifier information and resource scheduling information.

14. The security message transmission apparatus according to claim 11, wherein the determining unit is configured to:
 query a forwarding area mapping table, to obtain the forwarding area corresponding to the priority indication information; or
 determine the message type of the security message according to the priority indication information, and query a forwarding area mapping table, to obtain the forwarding area corresponding to the message type.

15. A security message transmission method, comprising:
 generating, by a vehicle terminal, a first security message, wherein the first security message carries message type information;
 adding priority indication information of the first security message to a geographic information layer of a protocol stack of the vehicle terminal according to the message type information to thereby obtain a second security message, the geographic information layer being provided above a Packet Data Convergence Control (PDCP) layer of the protocol stack;
 passing the second security message through at least one of the PDCP layer and a radio link control layer of the protocol stack in a transparent manner to transmit the second security message to a Media Access Control (MAC) layer, without performing header compression with respect to the second security message;

determining, at the MAC layer of the protocol stack, a transmission path of the second security message according to the priority indication information; and sending the second security message to a recipient by using a physical layer of the protocol stack corresponding to the determined transmission path, so that the recipient performs forwarding processing on the second security message.

* * * * *